(12) United States Patent
Govindarajan et al.

(10) Patent No.: US 7,007,037 B2
(45) Date of Patent: *Feb. 28, 2006

(54) OPAQUE TYPES

(75) Inventors: Rajagopalan Govindarajan, Fremont, CA (US); Viswanathan Krishnamurthy, Fremont, CA (US); Anil Nori, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 10/192,411

(22) Filed: Jul. 9, 2002

(65) Prior Publication Data

US 2002/0174128 A1 Nov. 21, 2002

Related U.S. Application Data

(62) Division of application No. 09/629,541, filed on Jul. 31, 2000, now Pat. No. 6,470,348.

(51) Int. Cl.
*G06F 17/00* (2006.01)

(52) U.S. Cl. .................. 707/104.1; 707/101; 707/102; 707/3; 707/103 Y (58) Field of Classification Search .............. 707/104.1, 707/100–102, 10, 3, 103 Y
See application file for complete search history.

(56) References Cited

U.S. PATENT DOCUMENTS 3,870,574 A * 3/1975 Stefan et al. ............... 148/122
5,363,098 A   11/1994 Antoshenkov (Continued)

FOREIGN PATENT DOCUMENTS

EP     0 606 137 A2    7/1994

OTHER PUBLICATIONS

"Oracle 7.3 Focuses on Data Warehousing", by Dan Richman, Sep. 25, 1995.
"Oracle: Oracle, HP and EMC combines forces to create world's largest data warehouse", by M2 Presswire, Sep. 19, 1995, pp. 14–16.
"Multi–Table Joins Through Bitmapped Join Indice", P. O'Neil, G. Graefe, SIGMOD Record, vol. 24, No. 3, Sep., 1995, 6 pages.
Herb Edelstein, "Technology Analysis—Faster Data Warehouse—New Tools Provide High—Performance Querying Through Advanced Indexing", Information Week, Dec. 4, 1995, pp. 3–8.

(Continued)

*Primary Examiner*—Alford Kindred
*Assistant Examiner*—Sana Al-Hashemi
(74) *Attorney, Agent, or Firm*—Marcel K. Bingham; Hickman Palermo Truong & Becker LLP (57) ABSTRACT

A method and apparatus are provided for handling within a database system data items that are associated with data types whose native structure is not known to the database system. The data items are stored within the database system in their native structure, even though it is not understood by the database system. To store the data items, the database system calls a pickling routine that is provided by the user, or by the runtime subsystem of the programming environment that is native to the data item. To retrieve the routine from storage, the database system calls an unpickling routine, also provided by the user or the appropriate runtime subsystem. Because the database maintains the data items in their native format, no conversions are required as the data items are passed between the database system and external routines that manipulate the data items.

22 Claims, 4 Drawing Sheets

U.S. PATENT DOCUMENTS

| | | | |
|---|---|---|---|
| 5,404,411 | A | 4/1995 | Banton et al. |
| 5,442,715 | A | 8/1995 | Gaborski et al. |
| 5,465,322 | A | 11/1995 | Hsu et al. |
| 5,495,608 | A | 2/1996 | Antoshenkov |
| 5,497,491 | A | 3/1996 | Mitchell et al. |
| 5,502,804 | A | 3/1996 | Butterfield |
| 5,504,889 | A | 4/1996 | Burgess |
| 5,552,898 | A | 9/1996 | Deschuytere |
| 5,604,850 | A | 2/1997 | Whitmer |
| 5,642,473 | A | 6/1997 | Klotz, Jr. |
| 5,649,181 | A | 7/1997 | French et al. |
| 5,664,172 | A | 9/1997 | Antoshenkov |
| 5,706,495 | A | 1/1998 | Chadha et al. |
| 5,742,816 | A | 4/1998 | Barr et al. |
| 5,751,921 | A | 5/1998 | Fujimoto |
| 5,815,574 | A | 9/1998 | Fortinsky |
| 5,845,276 | A | 12/1998 | Emerson et al. |
| 5,870,764 | A | 2/1999 | Lo et al. |
| 5,878,415 | A | 3/1999 | Olds |
| 5,884,307 | A | 3/1999 | Depledge et al. |
| 5,893,104 | A | 4/1999 | Srinivasan et al. |
| 5,899,988 | A | 5/1999 | Depledge et al. |
| 5,907,297 | A | 5/1999 | Cohen et al. |
| 5,963,935 | A | 10/1999 | Ozbutun et al. |
| 5,987,506 | A | 11/1999 | Carter et al. |
| 6,012,067 | A | 1/2000 | Sarkar |
| 6,038,563 | A | 3/2000 | Bapat et al. |
| 6,061,684 | A | 5/2000 | Glasser et al. |
| 6,061,690 | A | 5/2000 | Nori et al. |
| 6,101,501 | A | 8/2000 | Breslau et al. |
| 6,112,207 | A * | 8/2000 | Nori et al. ................... 707/101 |
| 6,112,210 | A * | 8/2000 | Nori et al. ............... 707/103 R |
| 6,121,924 | A | 9/2000 | Meek et al. |
| 6,128,621 | A * | 10/2000 | Weisz ..................... 707/103 Y |
| 6,151,584 | A | 11/2000 | Papierniak et al. |
| 6,151,624 | A | 11/2000 | Teare et al. |
| 6,154,741 | A | 11/2000 | Feldman |
| 6,199,195 | B1 | 3/2001 | Goodwin et al. |
| 6,263,332 | B1 | 7/2001 | Nasr et al. |
| 6,286,015 | B1 * | 9/2001 | Govindarajan et al. ...... 707/201 |
| 6,298,349 | B1 | 10/2001 | Toyoshima et al. |
| 6,343,287 | B1 | 1/2002 | Kumar et al. |
| 6,356,920 | B1 | 3/2002 | Vandersluis |
| 6,366,934 | B1 | 4/2002 | Cheng et al. |
| 6,772,350 | B1 | 8/2004 | Belani et al. |
| 6,785,673 | B1 | 8/2004 | Fernandez et al. |
| 2003/0093672 | A1 | 5/2003 | Cichowlas |
| 2003/0182624 | A1 | 9/2003 | Large |

OTHER PUBLICATIONS

Kung–Lung Wu, "Range–based bitmap indexing for high cardinality attributes with skew", COMPSAC '98, Proceedings. The Twenty–Second Annual International Computer Software and Applications Conference, 198, Aug. 19–21, 1998, pp. 61–66.

"Oracle TextServer 3 Concepts, Indexing," pp. 3.1–3.29.

"SQL TextRetrieval Administrator's Guide," version 2.0, Jul. 1992, pp. 1–1–12.17.

"IOUW Wrap–Up. (Vendors Introduce Database Tools at International Oracle User's Week Conference)", DBMS, Dec. 1995, v. 8, n13, p. 112.

"Oracle 7 Release 7.3 Extends Oracle's Lead in Data Warehousing Market", Oracle Press Release, Sep. 19, 1995, 3 pages.

Martin Rennhackkamp, "Oracle Finally Puts Its Money Where Its Mouth is with Oracle7 Release 7.3 and the Universal Server", DBMS, v9, n12, p 12, Nov. 1996.

Kenneth W. Ludwick, "Consolidated Automated Support System (CASS), Automated Technical Information, (ATI), Display System using ASCII Data Files", 1994, pp. 103–113.

Riggs, R. et al, Pickling state in the Java/sup TM System, pp. 241–240, XP002128178, 1996, Berkeley, CA, USA, USENIX Assoc., USA Abstract.

"Universal Data Option for Informix Dynamic Server", Informix Corporation, Online! 1998, pp. 1–8, XP002128177, Retrieved from the Internet, http://www.informix.com/informix/techbriefs/udo.pdf, retrieved on Jan. 14, 2000! The whole document.

"Model 204 Architecture and Performance", High Performance Transaction System, $2^{nd}$ International Workshop, Sep. 28, 1997, pp. 40–57.

Extending Informix—Universal Server: Data Types, Version 9.1, Chapters 1–5, Mar. 1997.

Baldonado et al., "An Extensible Constructor Tool for the Rapid, Interactive Design of Query Synthesizers", ACM '998, p. 19–28.

Jordan, Mick, "An Extensible Programming Environment of Modula–3" Proceedings of the fourth ACM SIGSOFT symposium on Software development environments, Dec. 3–5, 1990, Irvine, California, p. 66–76.

Jim Diederich, et al., "Creating Domain Specific Metadata for Scientific Data and Knowledge Bases," IEEE 1991, p. 421–434.

Samuel DeFazio, et al., "Database Extensions for Complex Domains," IEEE, 1996, p. 200–202.

Antoshenkov, G., "Byte–aligned bitmap compression", Proceedings Data Compression Conference, 1995. DCC'95. Mar. 28–30, 1995, p. 476.

Bookstein, A., "Flexible compression for bitmap sets", Data Compression Conference, 1991. DCC '91., Apr. 8–11, 1991, pp. 402–410.

M. Weiss, "Data Structures and Algorithm Analysis in C++", 1994, pp. 165–170.

Ming–Chuan Wu, "Encoded Bitmap indexing for data warehouses", Proceedings, $14^{th}$ International Conference on Data Engineering, 1998., Feb. 1998, pp. 220–230.

Lawrence J. Ellison, et al., "Oracle to Host First Developer Conference; Preview new Products", http://www.oracle.com/corporate/press/html/odc2.htm, printed May 6, 1996, 4 pages.

* cited by examiner

OPAQUE TYPES

RELATED APPLICATIONS

This application is a divisional of U.S. patent application Ser. No. 09/629,541, filed on Jul. 31, 2000 now U.S. Pat. No. 6,470,348, entitled "Opaque Types," the contents of which are incorporated herein by reference in its entirety; this application is a continuation of U.S. Pat. No. 6,286,015 B1, issued on Sep. 4, 2001, entitled "Opaque Types," the contents of which are incorporated herein by reference in its entirety, and which was copending with aforementioned U.S. patent application Ser. No. 09/629,541.

FIELD OF THE INVENTION

The present invention relates to database systems and, more specifically, to the use of user-defined data types within database systems.

BACKGROUND OF THE INVENTION

Typically, data items are stored on non-volatile memory in a different way than they are stored in volatile memory. Thus, when loaded into volatile memory from non-volatile memory, some conversion operation must be performed. Similarly, when stored back onto non-volatile memory from volatile memory, another conversion operation must be performed. For the purpose of explanation, the process of converting data from a volatile format to a non-volatile format is referred to herein as "pickling" the data item, and the process of converting data from a non-volatile format to a volatile format is referred to herein as "unpickling" the data item.

Many conventional relational database systems perform automatic pickling and unpickling for only a few types of data. The types of data supported by such systems typically include scalar types, such as numbers and dates. Relative to other programming environments, such as "C" and "Java", the set of data types supported by typical database systems is extremely limited. Thus, difficulties arise when the database systems are used to store data that is created and used by computer programs that were written in those other environments.

For example, a user may create a set of routines that represent and manipulate data using a complex user-defined data type ("TYPE1"). For the purpose of illustration, the user-implemented routines that use TYPE1 are collectively referred to herein as APP1.

The structure of TYPE1, or any of the attributes thereof, may be significantly different than the structure of any data type supported by a database system ("DBS1"). To pass the data used by APP1 to a database managed by DBS1, every TYPE1 data item must be converted to one or more instances of the data types that are supported by DBS1. Once the data is converted to data types that DBS1 understands and supports, DBS1 can store and retrieve the data from disk. Likewise, for APP1 to use data from DBS1, the data must be converted from the structure associated with the data types supported by DBS1 into the structure and format associated with TYPE1.

Figure 1:
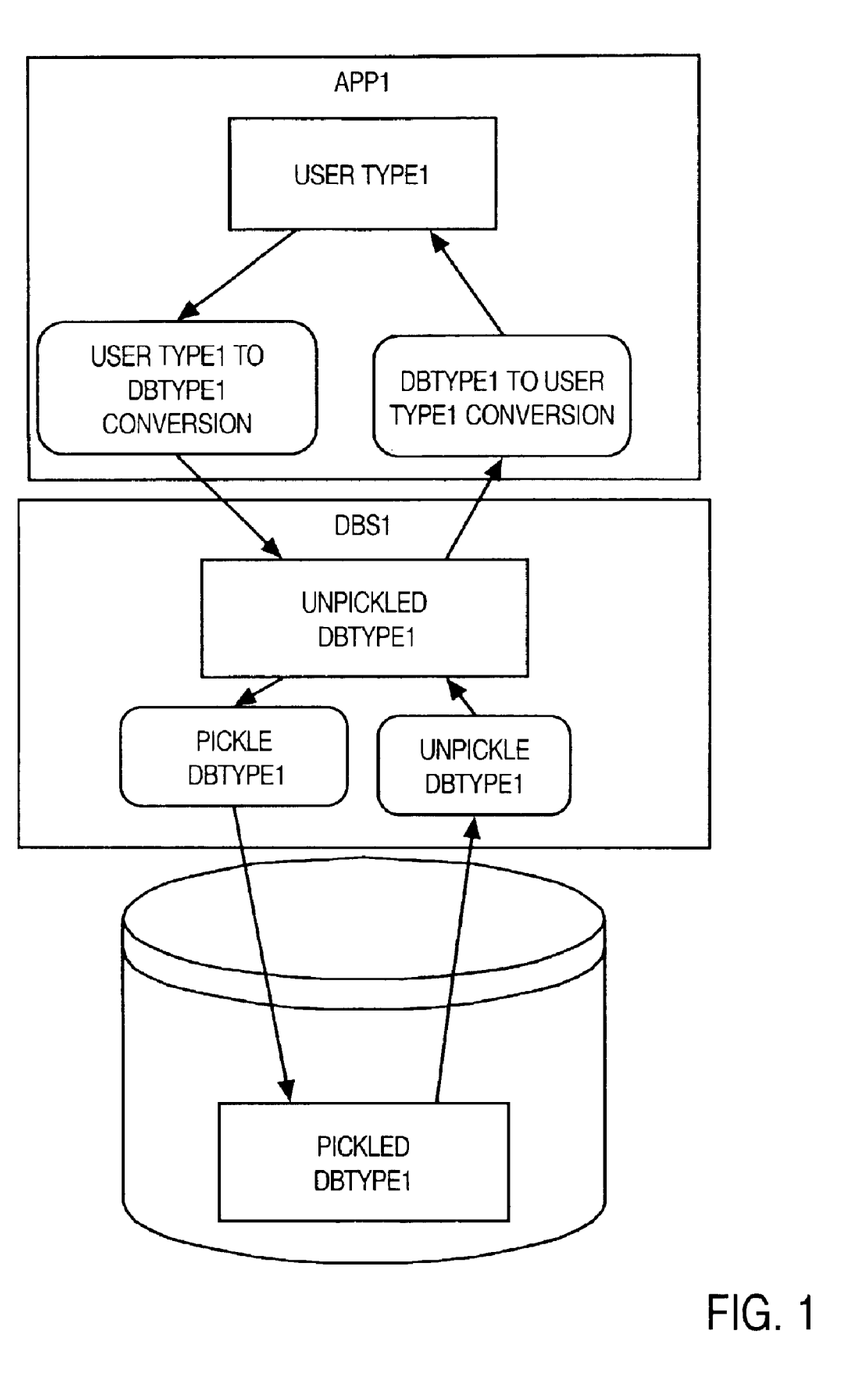
FIG. 1 is a block diagram illustrating the various conversions that occur when an application stores its data using a database system that does not support the data structures used by the application.

Referring to FIG. 1, it is a block diagram illustrating the conversion operations that must be performed to allow APP1 to store its data within DBS1. Specifically, a data item generated within APP1 is stored according to the structure and format of user TYPE1. To pass the data item into DBS1 for storage, the data item is converted to a data type supported by DBS1 (DBTYPE1). While in volatile memory within DBS1, the data item is stored as an unpickled DBTYPE1. DBS1 pickles the DBTYPE1 data item to store it on disk.

To supply APP1 with a data item stored on disk, DBS1 unpickles the data item to create an unpickled DBTYPE1 data item. The unpickled DBTYPE1 data item is then converted to the user TYPE1 data type before being supplied to the routines within APP1 that manipulate the data item.

An example of a user-defined type is a type declared as follows:

struct TYPE1

{ int i;

char*s;

}

This declaration may occur, for example, within the source code of APP1. The source code of APP1 also includes one or more methods used to manipulate data that is stored in a TYPE1 data structure. An example of the interface to such method is:

my_method(TYPE1*me,int i);

A TYPE1 data item may be passed into DBS1 by mapping the attributes of TYPE1 to data types that are supported by DBS1, such as Number and Date. An example of a statement to create a database object for storing data from a TYPE1 data item is:

create type DBTYPE1 as OBJECT ( a Number;

b Date;

memberprocedure.set_date( );

)

To convert data between the TYPE1 structure used by APP1 and the DBTYPE1 structure used within DBS1 to store TYPE1 data, the following structure may be used:

struct

{

OCINumber n;

OCIDate d;

}

In this example, it was assumed that the attributes of TYPE1 could be adequately represented by data types supported by DBS1. However, data types designed and implemented in common programming languages (such as C or Java) are not easily captured by the database system because their internal structures are modeled using the particular constructs of the language, and are not understood by the database system.

Object oriented databases are tightly coupled to a particular programming language and, even though they enable modeling of data types in that language, the flexibility of language neutrality in the database system is lost. For example, if DBS1 is designed around the same language as was used to create APP1, then DBS1 may support the TYPE1 data type. But if, on the other hand, DBS1 is designed around a different language than was used to create APP1, complicated conversions may still be necessary.

To reduce the burden associated with converting user-defined types whose attributes do not closely correspond to data types supported by a database system, some database systems support a "RAW" data type. From the perspective of the database system, a RAW data item is simply a dump of bytes with no structure. As with other database-supported data types, RAW data items may be stored in the columns of relational tables. Because the database system does not assume any structure to a RAW data item, the RAW data item may be used to store the data for complex user-defined data types that have attributes that are not easily converted to any data type supported by the database system.

The following statements create a table with a RAW column that can be used, for example, for storing data from a TYPE1 data items.

create table t (col1 raw(20), . . . );

The following statement creates a routine that is internal to the database for invoking the external my_method routine:

create procedure mymethod(a IN RAW)

The input to this internal routine is a RAW data item, while the external my_method routine expects a TYPE1 data item. Consequently, the implementation of the mymethod procedure must take the form:

my method(a)

{ raw-to-struct(a)

manipulate struct-to-raw(a)

}

In this example, the mymethod routine receives a RAW data item "a". The raw-to-struct(a) statement invokes a user-supplied routine that converts the data item from the RAW format used by the database to store the data item to the TYPE1 format used by APP1. The "manipulate" statement generally represents calls to user-supplied routines that manipulate the TYPE1 data item. After the desired operations have been performed on the data item, the call to struct-to-raw(a) converts the data item from the TYPE1 structure back to the RAW format used by the database.

Figure 2:
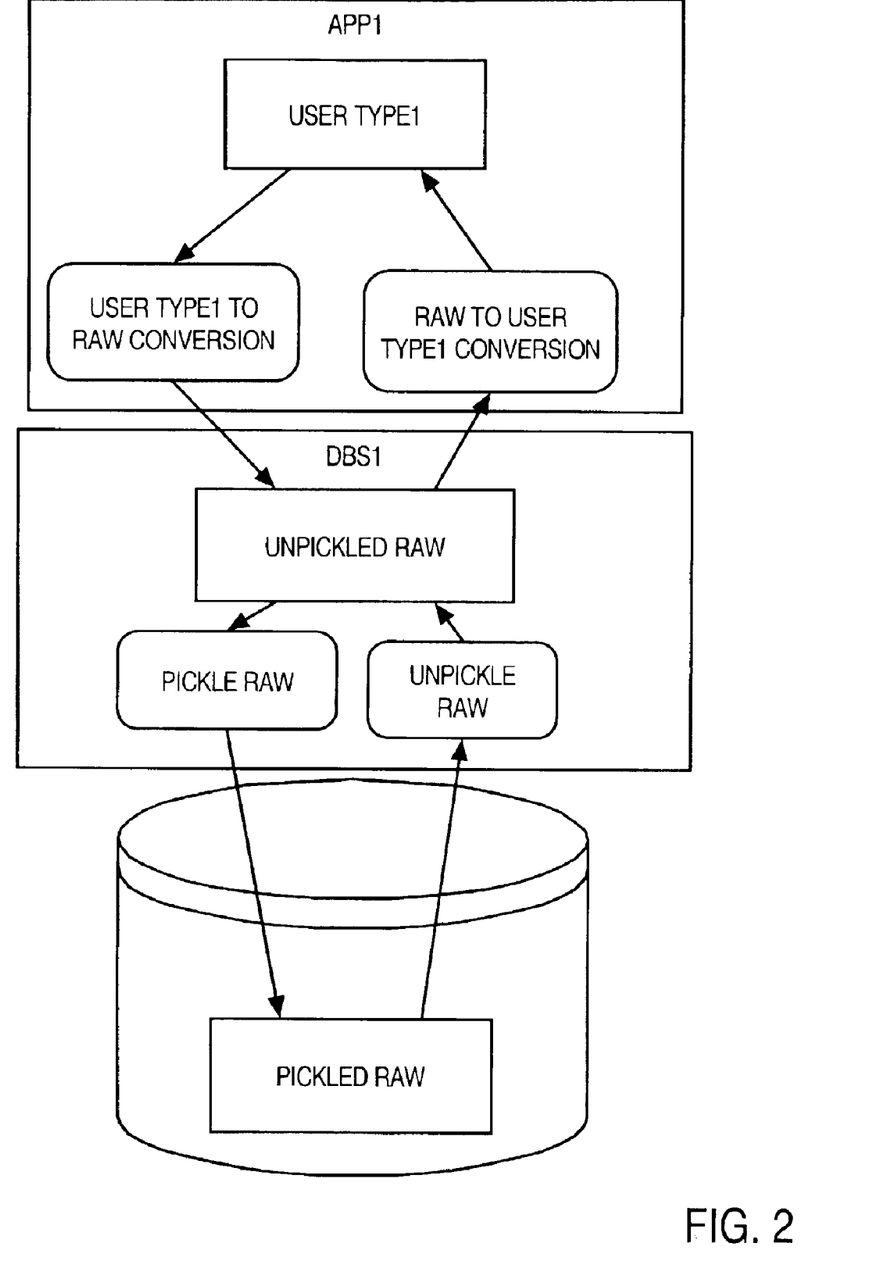
FIG. 2 is a block diagram illustrating the various conversions that occur when an application stores its data using a database system that supports the RAW data type, but does not support the data structures used by the application.

Referring to FIG. 2, it is a block diagram illustrating the conversion operations that must be performed to allow APP1 to store its data within a database (DBS1) that supports the RAW data type. Specifically, a data item generated within APP1 is formatted according as "user type1". To pass the data item into DBS1 for storage, the data item is converted to the RAW data type. While in volatile memory within DBS1, the data item is stored as unpickled RAW data. DBS1 pickles the RAW data to store it on disk.

To supply APP1 with a data item stored in the database, DBS1 unpickles the RAW data item to create unpickled RAW data. The unpickled RAW data is then converted to the user TYPE1 data type before being supplied to the routines within APP1 that manipulate the data item.

As illustrated by the example, even with database systems that support the RAW data type, the user that creates the user-defined type (the "type implementor") is responsible for providing routines for converting RAW entities back and forth into their appropriate structured equivalents every time the control is handed over to user routines from the database system. Specifically, in the example given above, the type implementor is responsible for writing the raw-to-struct and struct-to-raw routines.

There are various drawbacks associated with storing data from user-defined types as RAW data items within the database. For example, this technique does not support strong typing. That is, data items associated with different user-defined types are stored in the database as the same database type. Thus, the database system and other database users cannot differentiate one of these types from another, as they are all treated as raw entities by the database management system. Consequently, the database system would not be able to detect situations in which one user erroneously stores data from one kind of user-defined data type in a RAW column that is supposed to hold data from a different kind of user-defined data type.

In addition, the technique of storing user-defined types as RAW data provides poor modeling. It is very cumbersome for a type implementor to work around the database system's inability to store user-defined data types. Further, this technique provides relatively poor performance because performing conversions every time data moves back and forth between the database system and the user application is computationally expensive.

To provide support for strong typing as well as take advantage of database support for the RAW data type, the data for user-defined types may be stored in database object types that have RAW attributes. For example, assume that a type implementor has defined two types TYPE1 and TYPE2. Data from the TYPE1 user type may be stored in database objects created by the following statements:

create type DBTYPE1 as OBJECT ( a RAW(20);

mymethod1(a IN DBTYPE1);

)

Similarly, data from the TYPE2 user type may be stored in database objects created by the following statements:

create type DBTYPE2 as OBJECT ( a RAW(20);

mymethod2(a IN DBTYPE2);

)

By using database-defined objects in combination with the RAW data type in this manner, the data associated with TYPE1 and TYPE2 user-defined data types may be distinguished from each other within the database system. However, the type implementor is still responsible for supplying raw-to-native-format conversion routines. In addition, the overhead associated with invoking the conversion routines is still incurred every time data for the user defined types passes between the database system and the user-supplied routines.

Specifically, if the mymethod1 routine is to perform any data manipulation, then the RAW attribute of the input data item "a" must be converted from a RAW data item to a TYPE1 data item. After the manipulation, the TYPE1 data item must be converted back to the RAW data attribute. Similarly, mymethod2 would involve converting a RAW attribute to a TYPE2 data item, calling an external routine, and then converting the TYPE2 data item back to a RAW data attribute.

Based on the foregoing, it is clearly desirable to provide a mechanism that allows a type-implementor to construct data types in the programming language of the type-implementor's choice (C, JAVA, etc). It is further desirable to have a database system store and index those data types even though it does not understand the internal structure of such types. In addition, it is desirable to provide a mechanism that allows data of user-defined types to appear in their native language environment in their native form (as C structures or Java classes) while continuing to be accessible from other language environments in the database management system. It is also desirable to reduce or eliminate the need to perform conversions every time a set of data passes between the database environment and its native language environment.

SUMMARY OF THE INVENTION

A method and apparatus are provided for handling within a database system data items that are associated with data types whose native structure is not known to the database system. The data items are stored within the database system in their native structure, even though it is not understood by the database system. To store the data items, the database system calls a pickling routine that is provided by the user, or by the runtime subsystem of the programming environment that is native to the data item. To retrieve the routine from storage, the database system calls an unpickling routine, also provided by the user or the appropriate runtime subsystem. Because the database maintains the data items in their native format, no conversions are required as the data items are passed between the database system and external routines that manipulate the data items.

Techniques are also provided for declaring attributes of the data item that can be accessed within the database system. The user provides routines for the database system to call in order to access the declared attributes, which may be different than the actual attributes that the data item has in its native environment.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for storing user-implemented data types in database systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 3:
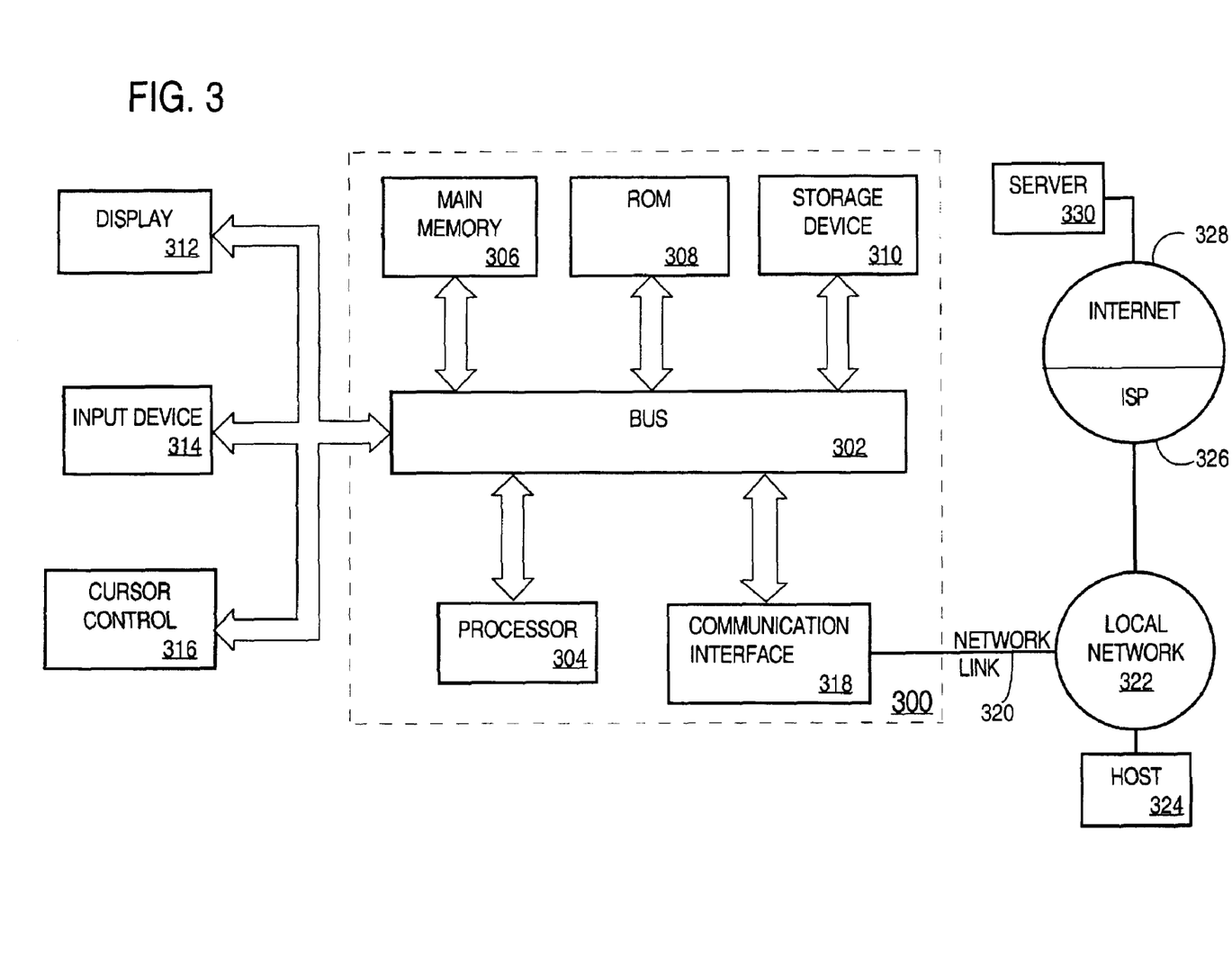
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for storing user-implemented data types in database systems. According to one embodiment of the invention, user-implemented data types are stored in a database system executing on computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Overview of Opaque Types

According to one aspect of the invention, a type implementor of a data type that is not supported by a database system registers the data type with the database system. During the registration, the database system is supplied information about the data type. The information supplied about the data type may include, for example, a name for the data type, names for attributes of the data type, routines for pickling and unpickling the data type, and routines for getting and setting individual attributes of the data type.

The information supplied to the database system allows the database system to invoke mechanisms to pickle the native structure of a data item that belongs to the user-defined data type so that the data item may be stored on disk, and to unpickle the data item to retrieve the data item from disk in its native structure. While stored in volatile memory within the database, the data item remains in its native structure so that when passed between the database system and external routines, no conversions are required.

User-defined data types that are registered in this fashion are referred to herein as "opaque types" because data items that belong to such user-defined data types reside within the database system in structures that are not known to or understood by the database system.

Type Implementor-supplied Pickling Routines

As mentioned above, during the opaque type registration process, the type implementor may supply to the database system pickling and unpickling routines for use with the opaque type.

The pickling routine converts data from the structure and format expected by external routines that manipulate the opaque type (the "native structure") to a format suitable for durable storage (a "storable structure"). Conversely, the unpickling routine converts data from the storable structure to the native structure. The database system invokes the pickling and unpickling routines for the user-supplied data type under the same conditions that it invokes the built-in pickling and unpickling routines for the data types supported by the database. Specifically, the unpickling routine is invoked in response to reading a data item of the user-defined type from non-volatile storage into volatile storage controlled by the database system. The pickling routine is invoked prior to storing to non-volatile storage a data item of the user defined type that resides in volatile storage controlled by the database system.

Because the database system has control of the pickling and unpickling routines of the opaque type, data items associated with the opaque type are able to exist in their native structure while still within the database system. Because the structure and format of the data items within the database system are the same structure and format that are required by the external routines that manipulate the data items, the data items do not have to be converted when passed back and forth between those routines and the database system.

Figure 4:
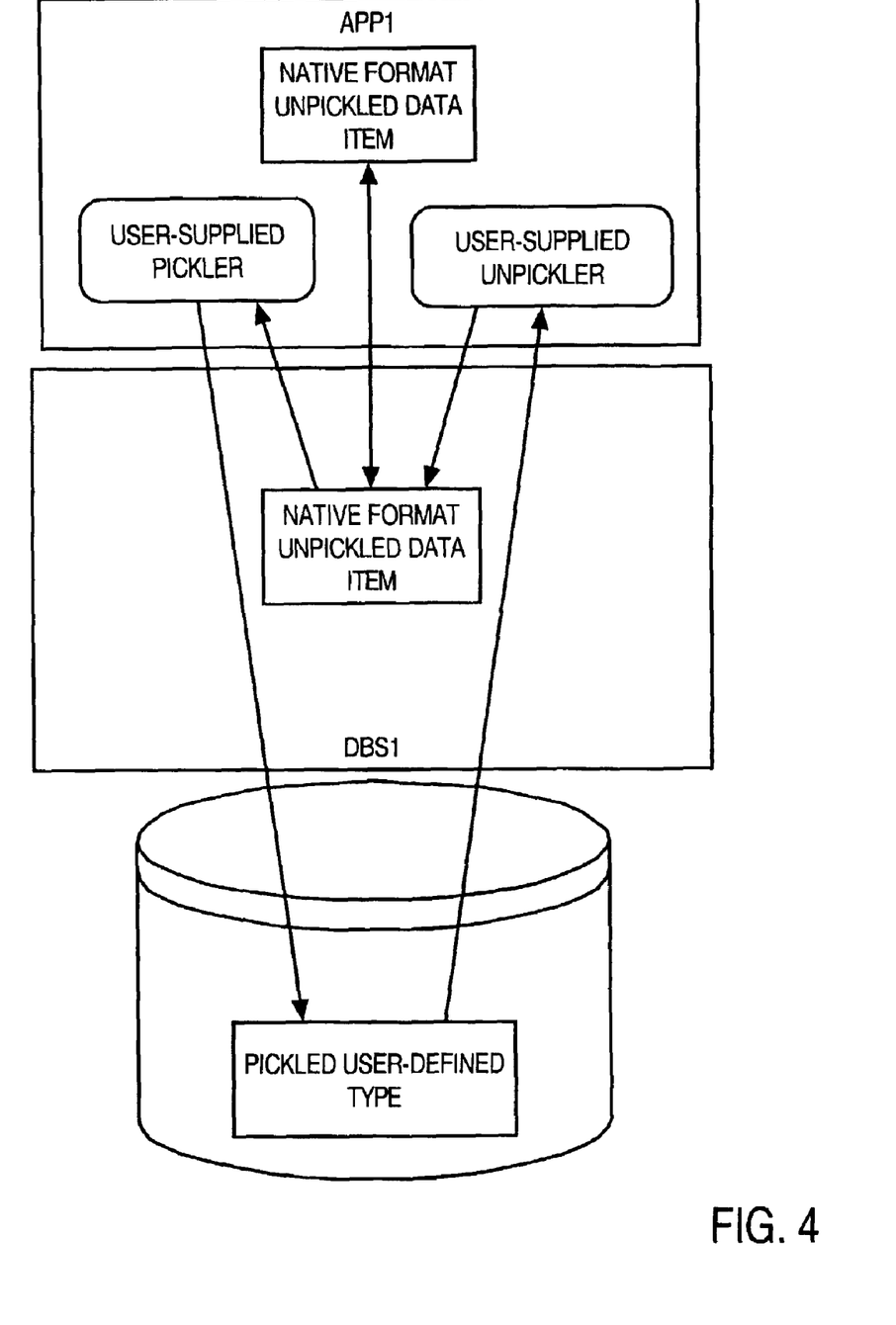
FIG. 4 is a block diagram illustrating how data items are not converted as they pass between the database system and external routines when data items are stored in their native format within the database system according to an embodiment of the invention.

Referring to FIG. 4, it is a block diagram illustrating the conversion operations that must be performed to allow APP1 to store its data within a database system (DBS1) that supports opaque types. Specifically, a data item generated within APP1 is stored and manipulated within APP1 according to the structure and format of user TYPE1. Within DBS1, the data item remains in its native structure and format. Thus, no conversion is performed when the data item is passed into DBS1 for storage. DBS1 pickles the data item to store it on disk by calling a pickling routine supplied by the type implementor.

To supply APP1 with a data item stored on disk, DBS1 unpickles the data item by calling an unpickling routine supplied by the type implementor. While unpickled within DBS1, the data item is in its native structure and format. Thus, the unpickled data item can be supplied to the routines within APP1 that manipulate the data item without performing any additional conversions.

The value of the ability to avoid performing conversions every time a data item passes between the database system and external routines increases as the cost of the conversion operation increases. For example, assume that a user-defined data type holds data for large digital images. For performance reasons, the external routines are designed to manipulate uncompressed images. However, to conserve disk space, the images are to be stored on disk in a compressed format.

In a database system that does not support opaque types, to ensure that the images will be compressed before they are stored by the database system, the external routines would have to compress every image before passing the image to the database system. Similarly, the external routines would have to uncompress every image received from the database system.

Using the support for opaque types, the user may register pickling and unpickling routines that respectively perform the compression and decompression. Consequently, the cost associated with compression would only be incurred when an image is actually stored to or retrieved from disk, and not every time the image passes between the database system and the external routines.

Language Based Pickling and Unpickling

According to another aspect of the invention, opaque types may be created in language environments in which the language environment dictates how data items are pickled and unpickled. For example, JAVA implemented data types are stored in class files that have a particular format, and the JAVA runtime subsystem provides a mechanism for loading JAVA classes into memory. Under these conditions, specific pickle and unpickle routines need not be registered for each individual JAVA class. Rather, the database system stores metadata that indicates which opaque types are JAVA classes. The database system then automatically invokes the appropriate JAVA routines within the JAVA runtime subsystem to pickle and unpickle objects that belong to such JAVA classes.

Accessing Attributes of Opaque Types

During the opaque type registration process, the type implementor may supply the database system with names for attributes of the opaque type and routines for getting and setting individual attributes of the opaque type. For example, the type implementor may submit the following statements to the database system:

create type foo as opaque object
(
attrib1, NUMBER;
attrib2, char(31);
)

In this example, an opaque type declaration for an opaque type with the name "foo" is submitted to the database system. The opaque type declaration supplies names for two attributes within the opaque type (attrib1 and attrib2). For each of the attributes, the declaration specifies a database-supported data type. Specifically, the database-supported data type specified for attrib1 is NUMBER, and the database-supported type specified for attrib2 is char(31). However, even with this name and type information, the opaque data type remains opaque because the database system does not understand the native structure of the opaque type. Hence, the database system is not able to access the individual attributes within a data item of type foo without assistance.

To allow the database system to access individual attributes within a data item of type foo, the type implementor registers with the database system routines for accessing individual attributes. For example, the user may supply two routines foo.attrib1.get(a OUT NUMBER) and foo.attrib1.set(a IN NUMBER). The foo.attrib1.get routine sets the value of an input parameter of type NUMBER to the value of the attrib1 attribute of a data item of type foo. The foo.attrib1.set routine sets the value of the attrib1 attribute of a data item of type foo to the value of an input parameter of type NUMBER.

There need not be a one-to-one mapping between the attributes listed in the opaque type definition supplied to the database system and the attributes in the native data type definition. Consequently, a type implementor has a high degree of flexibility with respect to what portions of an opaque type, if any, can be accessed within the database system environment. For example, a type implementor may create a "web_page" data type using the native-language declaration:

struct web_page
{
header: text;
body: text;
}

However, the type implementor may register the web_page type with the database system using the following opaque type declaration:

create type web_page as opaque object:
(
firstword: char(10)
checksum: NUMBER;
)

The opaque type declaration tells the database system that a web_page data item has two attributes: firstword and checksum. In its native environment, the web_page data item actually has two different attributes: header and body. Because, as in this example, the attributes specified in the opaque type declaration may not correspond to any of the native attributes of the data type, they are referred to herein as opaque type attributes.

The header and body attributes may be accessed and manipulated by invoking external routines that are aware of the native structure of the web_page type, but cannot be accessed directly within the database system. The database system does not even know that those attributes exist because they are not named in the opaque type declaration.

The type implementor creates the routines that allow the opaque type attributes to be accessed within the database system. Because those routines are written in the native environment of the data type, they are aware of and can access all native attributes of the data type. The attribute-access routines supplied by the type implementor to the database system determine which opaque type attributes can be accessed, and how they are accessed. For example, the type implementor of the web_page data type may register a web_page.firstword.get(a OUT Char(10)) function that stores into a database variable the first word within the body of a web_page data item. Similarly, the type implementor may register a web_page.checksum.out(a OUT Char(10)) routine that stores into a database NUMBER variable a checksum generated by applying a hash function to the body of a web_page data item.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-readable medium carrying one or more sequences of instructions for handling within a database system a data item that is associated with a data type whose native structure is not known to said database system, wherein execution of the one or more sequences of instructions by one or more processors causes the one or more processors to perform the steps of:

said database system receiving user input that specifies a pickling mechanism and an unpickling mechanism for said data type;

prior to storing said data item to non-volatile memory, said database system invoking said pickling mechanism to transform said data item from said native structure to a storable format;

upon reading said data item from non-volatile memory, said database system invoking said unpickling mechanism to transform said data item from said storable format to said native structure; and maintaining said data item in said native structure as the data item is passed between said database system and routines that expect said data item to be in said native structure.

2. The computer-readable medium of claim 1 wherein:

the step of invoking an unpickling mechanism is performed by invoking a runtime subsystem for a programming environment associated with the data type; and the step of invoking a pickling mechanism is performed by invoking said runtime subsystem for the programming environment associated with the data type.

3. The computer-readable medium of claim 1 wherein:

the computer-readable medium includes the sequences of instructions for performing the steps of the database system registering a first user-implemented routine for pickling data items that belong to said data type;

the database system registering a second user-implemented routine for unpickling data items that belong to said data type;

the step of invoking a pickling mechanism is performed by invoking said first user-implemented routine; and the step of invoking an unpickling mechanism is performed by invoking said second user-implemented routine.

4. The computer-readable medium of claim 1 further comprising instructions for performing the step of said database system receiving a type declaration associated with said data type, wherein said type declaration specifies one or more attributes that are of data types that are supported by said database system.

5. The computer-readable medium of claim 4 further comprising sequences of instructions for performing the steps of:

said database system registering a user-specified routine associated with a first attribute of said one or more attributes; and said database system invoking said user-specified routine to access said first attribute.

6. The computer-readable medium of claim 5 further comprising instructions for performing the steps of:

said database system registering a second user-specified routine associated with a second attribute of said one or more attributes; and said database system invoking said second user-specified routine to access said second attribute.

7. The computer-readable medium of claim 4 wherein:

said native structure has a plurality of attributes; and said plurality of attributes do not have a one-to-one correspondence with said one or more attributes specified by said type declaration.

8. The computer-readable medium of claim 7 wherein said native structure has an attribute that does not correspond to any of said one or more attributes specified by said type declaration.

9. The computer-readable medium of claim 7 wherein said native structure does not have any attribute that corresponds to one of said one or more attributes specified by said type declaration.

10. A method for handling within a database system a data item that is associated with a data type whose native structure is not known to said database system, comprising the steps of:

said database system receiving user input that specifies a pickling mechanism and an unpickling mechanism for said data type;

prior to storing said data item to non-volatile memory, said database system invoking said pickling mechanism to transform said data item from said native structure to a storable format;

upon reading said data item from non-volatile memory, said database system invoking said unpickling mechanism to transform said data item from said storable format to said native structure; and maintaining said data item in said native structure as the data item is passed between said database system and routines that expect said data item to be in said native structure.

11. The method of claim 10 wherein:

the step of invoking an unpickling mechanism is performed by invoking a runtime subsystem for a programming environment associated with the data type; and the step of invoking a pickling mechanism is performed by invoking said runtime subsystem for the programming environment associated with the data type.

12. The method of claim 10 further including:

the database system registering a first user-implemented routine for pickling data items that belong to said data type;

the database system registering a second user-implemented routine for unpickling data items that belong to said data type;

the step of invoking a pickling mechanism is performed by invoking said first user-implemented routine; and the step of invoking an unpickling mechanism is performed by invoking said second user-implemented routine.

13. The method of claim 10 further including said database system receiving a type declaration associated with said data type, wherein said type declaration specifies one or more attributes that are of data types that are supported by said database system.

14. The method of claim 13 further comprising:

said database system registering a user-specified routine associated with a first attribute of said one or more attributes; and said database system invoking said user-specified routine to access said first attribute.

15. The method of claim 14 further comprising:

said database system registering a second user-specified routine associated with a second attribute of said one or more attributes; and said database system invoking said second user-specified routine to access said second attribute.

16. The method of claim 13 wherein:

said native structure has a plurality of attributes; and said plurality of attributes do not have a one-to-one correspondence with said one or more attributes specified by said type declaration.

17. The method of claim 16 wherein said native structure has an attribute that does not correspond to any of said one or more attributes specified by said type declaration.

18. The method of claim 16 wherein said native structure does not have any attribute that corresponds to one of said one or more attributes specified by said type declaration.

19. A computer-readable medium carrying one or more sequences of instructions for handling within a database system a data item that is associated with a data type whose native structure is not known to said database system, wherein execution of the one or more sequences of instructions by one or more processors causes the one or more processors to perform the steps of:

the database system registering a first user-specified routine for pickling data items that belong to said data type;

the database system registering a second user-specified routine for unpickling data items that belong to said data type;

to store data items that belong to said data type on non-volatile memory, invoking said first user-specified routine for pickling data items that belong to said data type; and to load data items that belong to said data type from non-volatile memory, invoking said second user-specified routine for unpickling data items that belong to said data type;

said database system receiving user input that specifies the set of attributes;

said database system receiving user input that specifies a data type that is supported by said database system for each attribute in said set of attributes;

said database system receiving user input that specifies an external routine for accessing a first attribute of said set of attributes, wherein said external routine expects said data item to have said native structure; and said database system invoking said external routine to access said at least one attribute; in response to invoking said external routine, said database system receiving from said external routine a value that is structured according to the data type associated with said first attribute.

20. The computer-readable medium of claim 19, the steps further comprising maintaining said data item in said native structure as the data item is passed between said database system and routines that expect said data item to be in said native structure.

21. The computer-readable medium of claim 19 wherein said native structure has a plurality of attributes, and said plurality of attributes do not have a one-to-one correspondence with said set of attributes.

22. The computer-readable medium of claim 21 wherein the at least one attribute does not correspond to any of said plurality of attributes.

* * * * *